(12) United States Patent
Seibt

(10) Patent No.: US 9,260,850 B2
(45) Date of Patent: Feb. 16, 2016

(54) VACUUM TOILET HAVING A URINAL FUNCTION

(71) Applicant: Airbus Operations GmbH, Hamburg (DE)

(72) Inventor: Christian Seibt, Buchholz (DE)

(73) Assignee: Airbus Operations GmbH (DE)

( * ) Notice: Subject to any disclaimer, the term of this patent is extended or adjusted under 35 U.S.C. 154(b) by 176 days.

(21) Appl. No.: 14/063,498

(22) Filed: Oct. 25, 2013

(65) Prior Publication Data

US 2014/0047631 A1  Feb. 20, 2014

Related U.S. Application Data

(63) Continuation of application No. PCT/EP2012/057602, filed on Apr. 26, 2012.

(60) Provisional application No. 61/479,479, filed on Apr. 27, 2011.

(30) Foreign Application Priority Data

Apr. 27, 2011  (DE) .......... 10 2011 018 809

(51) Int. Cl.
*B64D 11/02* (2006.01)
*E03D 11/02* (2006.01)
*E03F 1/00* (2006.01)

(52) U.S. Cl.
CPC .............. *E03D 11/025* (2013.01); *B64D 11/02* (2013.01); *E03F 1/006* (2013.01); *Y02T 50/46* (2013.01)

(58) Field of Classification Search
CPC ........ B64D 11/02; E03D 11/025; E03F 1/006
USPC ............................................. 4/431
See application file for complete search history.

(56) References Cited

U.S. PATENT DOCUMENTS

| 4,184,506 A | 1/1980 | Varis et al. | |
|---|---|---|---|
| 6,401,270 B1 * | 6/2002 | Moore ............................. | 4/431 |
| 2001/0011391 A1 | 8/2001 | Rozenblatt | |
| 2010/0031432 A1 * | 2/2010 | Lappalainen ..................... | 4/431 |
| 2010/0064424 A1 * | 3/2010 | Hsu et al. .......................... | 4/304 |
| 2012/0012706 A1 | 1/2012 | Ehlers et al. | |

FOREIGN PATENT DOCUMENTS

| DE | 297 09 653 U1 | 7/1997 |
|---|---|---|
| DE | 600 27 944 T2 | 12/2006 |
| DE | 10 2006 016 030 A1 | 10/2007 |
| EP | 1 035 261 A2 | 9/2000 |
| WO | 01/90495 A1 | 11/2001 |
| WO | 2010/108780 A1 | 9/2010 |

* cited by examiner

*Primary Examiner* — Janie Christiansen
(74) *Attorney, Agent, or Firm* — Lerner, David, Littenberg, Krumholz & Mentlik, LLP

(57) ABSTRACT

A vacuum toilet unit having a urinal function with reduced noise emission, system design size and system weight, in which vacuum toilet unit a triggering device for triggering the vacuum valve is adapted in such a manner that the triggering unit may not be triggered when a sit-down toilet is in use as intended.

10 Claims, 4 Drawing Sheets

VACUUM TOILET HAVING A URINAL FUNCTION

CROSS-REFERENCE TO RELATED APPLICATIONS

The present application is a continuation of International Application No. PCT/EP2012/057602, filed Apr. 26, 2012, published in English, which claims the benefit of the filing date of U.S. Provisional Patent Application No. 61/479,479 filed Apr. 27, 2011 and of German Patent Application No. 10 2011 018 809.6 filed Apr. 27, 2011, the disclosures of which are hereby incorporated herein by reference.

TECHNICAL FIELD

The invention relates to a system for flushing a vacuum toilet, in particular to a vacuum toilet unit having a urinal function, in an aircraft.

BACKGROUND OF THE INVENTION

Known flushing devices for a vacuum toilet having a urinal may necessitate triggering a flushing action, after use of the urinal, by activating a triggering device. This then may result in flushing liquid being supplied to the urinal, and subsequently in a suction valve being opened in order to lead impurities contained in a discharge line of the urinal, as well as the flushing liquid, into the region of a wastewater tank. In this arrangement the transport process may usually be effected by a pressure differential between the wastewater tank and the space where the vacuum toilet is located. In conventional systems for flushing a vacuum toilet, during the flushing procedure there may be very considerably noise emission because of the airflows caused during the flushing procedure, which noise emission may be further amplified by a funnel effect of the urinal bowl or the toilet bowl. This problem was, for example, addressed in DE 10 2006 016 030 A1. For this purpose noise reduction of a vacuum toilet unit was realized by the supply of secondary air.

BRIEF SUMMARY OF THE INVENTION

There may be a need to provide a vacuum toilet unit having a urinal function, wherein said unit features reduced noise emission, a reduced system size and a reduced system weight.

The present invention relates to a vacuum toilet unit having a urinal function, an associated operating method, a computer program and a computer-readable storage medium.

According to an exemplary embodiment of the invention, a vacuum toilet unit having a urinal function is provided, with a sit-down toilet with a toilet water discharge, a urinal with a urinal water discharge, a main discharge, a vacuum valve, and a lockable triggering device for triggering the vacuum valve, wherein the main discharge to a vacuum wastewater system is separated by the vacuum valve, wherein the toilet water discharge and the urinal water discharge in the direction of flow lead to the main discharge so as to be upstream of the vacuum valve, wherein the triggering device for triggering the vacuum valve is adapted in such a manner that the triggering unit may not be triggered when the sit-down toilet is in use as intended.

In this manner it may become possible for the discharge of the wastewaters both of the toilet and of the urinal to take place by way of a shared vacuum valve. Triggering the vacuum valve may be caused, or blocked, by way of various triggering units or operating units and sensors. However, in each case opening of the valve is to be prevented when the sit-down toilet is in use as intended, in other words when a person is seated on the toilet with the lid in its open position, because otherwise there would be a danger of the person becoming stuck as a result of suction.

Furthermore, as an alternative, the triggering device for triggering the vacuum valve may be adapted in such a manner that triggering does not occur when the urinal is used in such a manner that there is a danger of a person becoming stuck as a result of suction.

During a flushing procedure, the main airflow is guided by way of the toilet unit, and the secondary airflow is guided by way of the urinal unit. In this way noise emission overall is reduced and there is no need to provide a further bypass line for guiding the main airflow for the purpose of noise reduction. Thus, with the vacuum toilet unit according to the invention, having a urinal function, when compared to a separate design of the toilet unit and the urinal unit, it is possible not only to do without a vacuum valve, but also without the bypass pipe. This provides more options of integration in the monument, and improves the economic efficiency as well as monument hygiene.

According to an exemplary embodiment of the invention, the vacuum toilet unit having a urinal function is further provided with an activation element for triggering the lockable triggering device, wherein the activation element is adapted in such a manner that locking takes place as a result of a person not being able to reach the activation element when the sit-down toilet is in use as intended.

In this manner, locking of the triggering device may already be caused as a result of an activation element not being able to be reached during use as intended.

According to an exemplary embodiment of the invention, the sit-down toilet comprises a person monitoring device that is adapted to lock the lockable triggering device when the presence of a person is detected during use of the sit-down toilet as intended.

In this manner, safety may be further improved, because the criterion of the person not being in the corresponding position must be met, in other words actual detection of the presence of a person must be carried out.

According to an exemplary embodiment of the invention, the sit-down toilet comprises a toilet lid sensor and is adapted to lock the lockable triggering device on the basis of an acquired position of a toilet lid by the toilet lid sensor.

In this manner, already an open toilet lid may lock triggering, or a closed toilet lid may release triggering. In this arrangement a toilet lid may be adapted in such a manner that it nevertheless allows non-hazardous suction of air in its closed state.

According to an exemplary embodiment of the invention, the sit-down toilet and the urinal are located in separate spaces in such a manner that simultaneous use as intended is possible.

In this manner the extent of use may be significantly increased, in particular because the urinal is no longer blocked by the use of the sit-down toilet. Nonetheless, suction of the urinal wastewater depends on the sit-down toilet located in another space not being occupied.

According to an exemplary embodiment of the invention, the sit-down toilet is adapted as a sound-absorbing bypass to the urinal during vacuum suction.

In this manner there is no need to provide a separate bypass line, e.g. incorporating a suction silencer, because the toilet already serves as a bypass. In this arrangement a corresponding shape of the toilet bowl may have a further noise-reducing effect.

According to an exemplary embodiment of the invention, the urinal is adapted as a sound-absorbing bypass to the sit-down toilet during vacuum suction.

In this manner there is no need to provide a separate bypass line, e.g. incorporating a suction silencer, because the urinal already serves as a bypass. In this arrangement a corresponding shape of the urinal bowl may have a further noise-reducing effect.

According to an exemplary embodiment of the invention, a plural number of urinals is provided, comprising one urinal water discharge, wherein the urinal water discharges in the direction of flow lead into the main discharge so as to be upstream of the vacuum valve, wherein the plural number of urinals together have an effective flow resistance that is matched to the flow resistance of the sit-down toilet, wherein the plural number of urinals are adapted as a sound-absorbing bypass to the sit-down toilet during vacuum suction.

In this manner the sound-absorbing effect of the plural number of urinals may be matched to that of the toilet so that this matching design may have a further noise-reducing effect.

According to an exemplary embodiment of the invention, the vacuum toilet unit having a urinal function comprises a second sit-down toilet with a second toilet water discharge, wherein the second toilet water discharge in the direction of flow leads into the main discharge so as to be upstream of the vacuum valve, wherein the lockable triggering device is adapted in such a manner that the triggering unit may not be triggered when either the sit-down toilet or the second sit-down toilet is in use as intended.

In this manner a still greater reduction in weight may be achieved, namely by increasing the number of toilets while retaining the number of vacuum valves or reducing the vacuum valves required overall, without, as a result of taking into account the situation of occupation of the sit-down toilets, there being an increase in the danger of a person becoming stuck as a result of suction.

According to an exemplary embodiment of the invention, the vacuum toilet facility having a urinal function further comprises an activation element for manually operating the lockable triggering device, wherein the triggering unit may not be triggered when either the sit-down toilet or the second sit-down toilet is in use as intended.

It may be considered to be an idea of the invention to combine a sit-down toilet and a urinal in a vacuum toilet unit in such a manner that only one vacuum valve is necessary for removal by suction, while opening of the valve is prevented if someone is seated on the sit-down toilet.

According to an exemplary embodiment of the invention, a method is provided that carries out a logical inquiry so that a triggering device of a vacuum toilet unit having a urinal function with a sit-down toilet and a urinal releases triggering of a vacuum valve only when the sit-down toilet is not in use as intended.

According to an exemplary embodiment of the invention, a computer program is provided which when executed on a processor is adapted to implement the method according to the invention.

According to an exemplary embodiment of the invention, a computer-readable medium is provided on which the computer program according to the invention is stored.

It should be noted that the above-described embodiments of the invention equally relate to the device, the method, the computer program, and the computer-readable storage medium.

The individual features may of course also be combined, as a result of which, in part, advantageous effects may arise which exceed the sum of the individual effects.

These and other aspects of the present invention are explained and illustrated with reference to the exemplary embodiments described below.

BRIEF DESCRIPTION OF THE DRAWINGS

Below, exemplary embodiments are described with reference to the following drawings.

DETAILED DESCRIPTION

Figure 1:
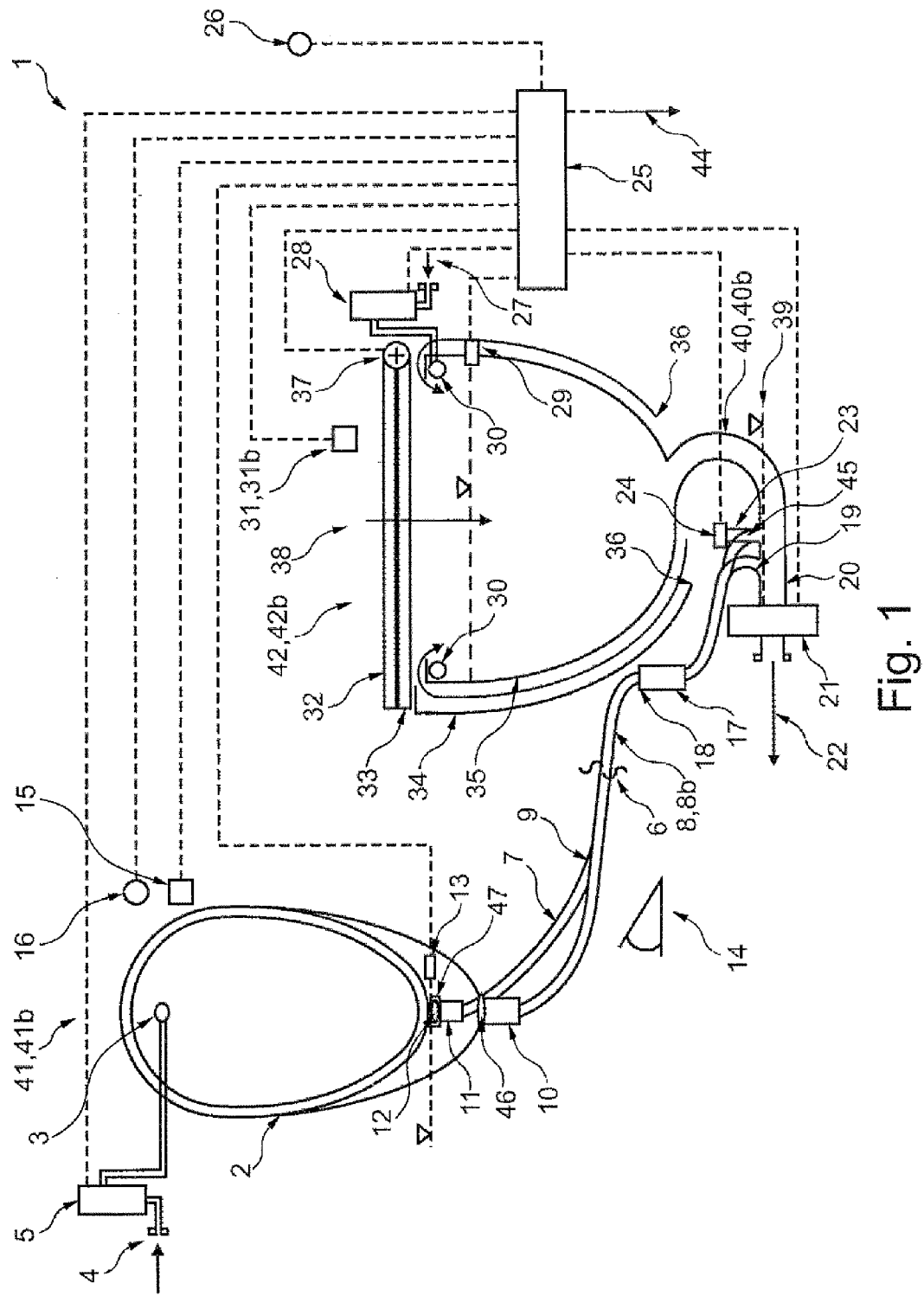
FIG. 1 shows a diagrammatic arrangement according to an exemplary embodiment of the invention.
Figure 3:
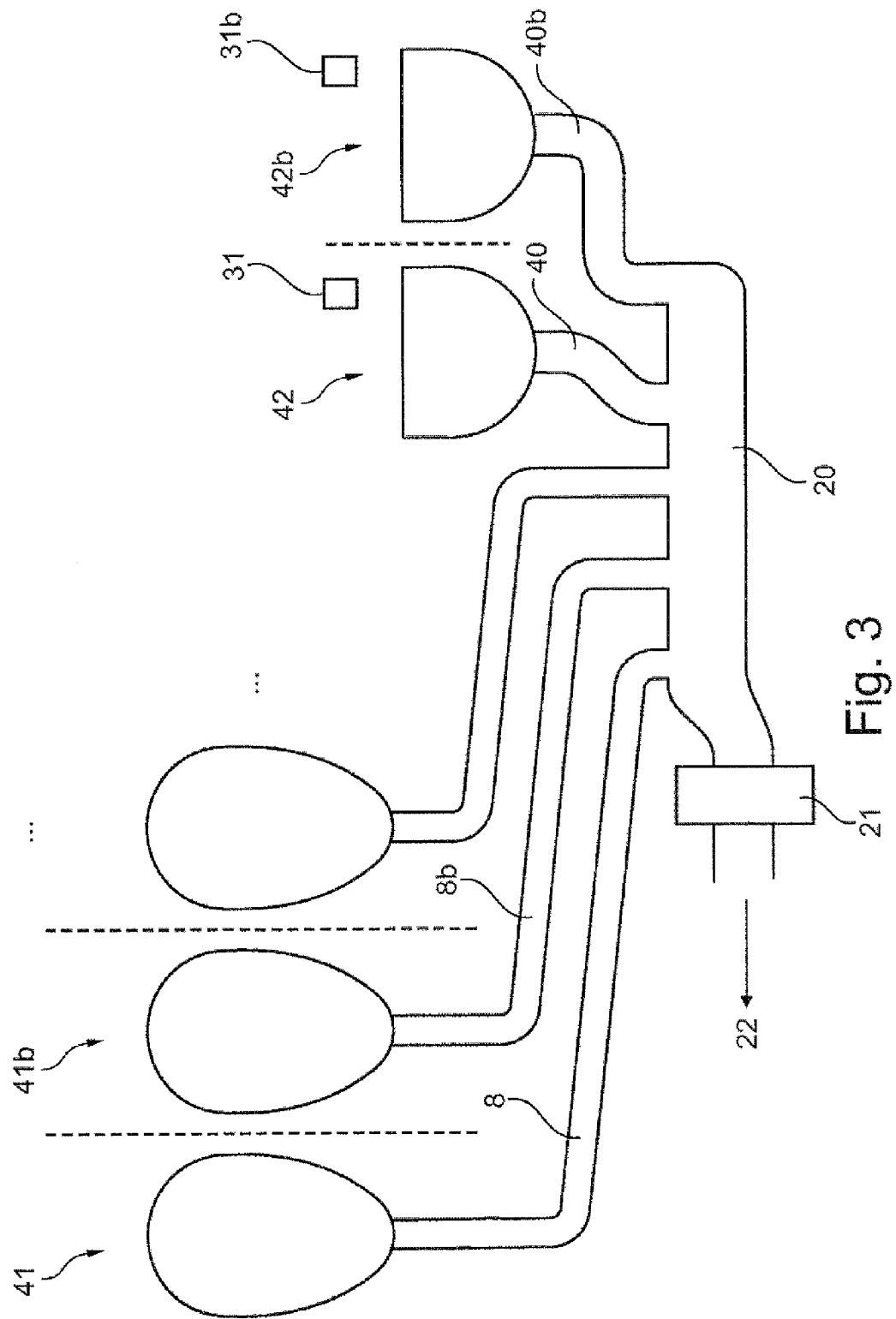
FIG. 3 shows a diagrammatic arrangement comprising a plurality of urinals and a plurality of sit-down toilets according to an exemplary embodiment of the invention.

FIG. 1. shows a diagrammatic arrangement of a vacuum toilet unit having a urinal function 1 according to an exemplary embodiment of the invention. The toilet unit with urinal function 1 comprises a urinal 41 and a sit-down toilet 42. As shown in FIG. 3, it is, however, also possible to provide several urinals 41, 41b and also several sit-down toilets 42, 42b, although they are not shown in FIG. 1. A urinal 41 comprises a urinal bowl 2 with a flushing nozzle or flushing ring 3 contained therein, which flushing nozzle or flushing ring 3 is connected to a flushing-water supply 4 by way of a flushing-water valve 5. A discharge line 8, 8b, which may be coupled to the wastewater system by way of a coupling 6, is connected to the urinal bowl 2. Furthermore, an overflow line 7, which is connected to an overflow 12, may be provided. Both the discharge 8 and the overflow 7 may comprise odor traps 10 or 11 so that odors may be kept away from the wastewater openings. The urinal discharge may be covered by a sieve 46 for screening coarse impurities; likewise, the urinal overflow may be covered by a sieve 47 for the same reason. The urinal bowl comprises a fill level sensor 13 that may be used for interrogating a triggering condition relating to the vacuum valve 21. The discharge pipe 8 comprises, for example, a gradient 14 so that the wastewater may discharge in a gravity-induced manner. On or near the urinal a person monitoring or space monitoring sensor 15 and also a triggering device 16 may be provided, which may both also be used for interrogating a triggering condition relating to the vacuum valve 21. The discharge pipe 8 may also be separated from the main discharge 20 by an odor trap 17, wherein the discharge line 8 of the urinal is coupled to the odor trap 17 by a coupling 18, and the discharge line of the urinal is furthermore coupled to the main discharge line 20 by a coupling 19. As an alternative, the discharge may also lead into the main discharge line 20 at an alternative location 45.

The toilet or sit-down toilet 42, 42b comprises a toilet bowl 35 which comprises, for example, a toilet cladding 34. The toilet 42, 42b furthermore comprises a toilet seat 33 and a toilet lid 32. In the toilet bowl 35 a flushing nozzle or a flushing ring 30 is provided which is connected to a flushing-water supply or flushing-liquid supply 27 by way of a flushing-water valve or flushing-liquid valve 28. During suction removal, air may be drawn in, by way of the incoming-air opening 36 for toilet flushing, when the toilet lid is in its closed state. This incoming-air opening or incoming-air duct 36 may be situated between the toilet bowl 35 and the toilet cladding 34. When the lid 32 is in its open state, the air may also be drawn in by way of the upper opening 38 of the toilet bowl 35. By way of a sensor 37 the position of the toilet lid may be acquired and used for evaluating a triggering condition. At the toilet a triggering device 26 for the toilet may be provided. Furthermore, a fill level sensor 29 may be provided in the toilet bowl 35, with the interrogation of said fill level sensor 29 also being able to be used for triggering the vacuum valve 21. Moreover, a person monitoring or space monitoring sensor 31 may be provided for querying the presence of a person. The wastewater may reach the main discharge or the main discharge line 20 by way of the discharge bend 40, 40b in a gravity-induced manner. The discharge bend may, of course, also be adapted as a straight piece of pipe.

A vacuum valve 21 separates the main discharge line 20 from the vacuum system 22 of the aircraft to which the wastewater disposal for the urinal and the toilet is connected. In and on the main discharge line 20, various sensors may be arranged, for example a fill-level sensor pickup 23 for the discharge line of the toilet, or a fill level sensor 24 for the discharge line of the toilet, which fill level sensor 24 determines the fill level 39 of the discharge line of the toilet.

All the operating units, sensors and interrogation elements are processed by the control unit 25 for the toilet and the urinal. Furthermore, a control connection 44 to the aircraft may be provided.

This device architecture according to the invention makes it possible to reduce the noise emission of a vacuum toilet unit by a secondary air supply 43 to one or several urinal units 41, 41b.

At installation positions of the unit according to the invention, which installation positions are in close proximity to a vacuum wastewater tank, a particularly positive effect of noise reduction may be achieved because the flow speeds during the suction removal process are above-average in the toilet units at the vacuum interface, and may be correspondingly reduced by the provision of a secondary air supply 4. The system 1 according to an embodiment of the invention provides significant advantages in terms of design size when compared to known vacuum urinals and vacuum toilets. As a result of the small number of components required to connect a urinal bowl 2 to a vacuum connection, a small design size, light weight, and a great variety of options for integration in the toilet monument are achieved. In particular with the use of several urinal units 41, 41b in one toilet unit 42 the advantages multiply. Connecting several urinal units 41, 41b is imaginable on coupling 6. The technical challenge of the system relates to the protection of persons during simultaneous use of the toilet unit 42 and the urinal unit 41. The urinal unit 41 and/or the toilet unit 42 may be located in a single monument, in further different monuments, or in separate monument regions.

Automatic triggering of a flushing process by the triggering device of the urinal 16, taking into account fill level measuring by way of the fill level sensor 13 in the urinal bowl and fill level measuring by way of the fill level sensor 24 in the discharge line of the toilet, also provides the background to the invention. By movement detectors or photoelectric barriers it is possible, for example, to transmit to the monitoring unit information relating to a potential user entering the toilet.

In the system 1 according to an embodiment of the invention the use of a control unit for detecting the closed toilet lid 32 may take place in order to simultaneously obtain the effect of noise reduction during the suction process. In small standard toilet monuments it may be possible to make do without these control units if as a result of intelligent arrangement in the confined space in the monument only the urinal unit 41 or only the toilet unit may be used. Further weight reduction may be achieved by "waterless operation" of the urinal unit 41. It is then possible to make do without the water supply unit with pipes for the flushing-water supply of the urinal bowl 4 by way of a flushing-water valve 5 and a flushing nozzle or flushing ring 3, and possibly it may also be possible to do without a fill level sensor 13 in the urinal bowl. It may also be possible to do without the triggering device 16 on the urinal if, in the case of a blocked urinal discharge, flushing for the purpose of unblocking is not required or not desired. It is also possible to do without the fill level sensor 13 in the urinal bowl when during waterless operation no flushing-water valve 5 is required, because in the case of a defect the urinal bowl is not flooded. In this case, automatic removal by suction, by way of measuring the maximum permissible fill level with the fill level sensor 13 in the urinal bowl, is not required.

In the case of reaching the fill level 39 in the discharge line 40 of the toilet or triggering or activation of the triggering device 16 on the urinal or triggering of the fill level sensor 13 in the urinal bowl, it is not mandatory for the suction process of the toilet unit 42 with preceding water flushing to take place immediately. In order to save water and additional weight, it is also possible to make do without such water flushing of the toilet unit 42, or to use water flushing, for example, only during every third suction process in order to clean the discharge line of the toilet 20.

In order to be able to reduce odor emanating from the pipe architecture of the urinal unit 41, odor traps 10, 11 and 17 may be integrated. An overflow 12 in the urinal bowl with an overflow line 7 may prevent overflowing of the urinal bowl 2.

Furthermore, depending on the adapt of the secondary airflow 43 of the urinal unit, the overflow line 7 of the urinal may be sensible in order to further reduce the flow speeds at the urinal discharge and the overflow, and consequently to further reduce noise emission. Furthermore, the flow resistance of the odor traps 10, 11 and 17 and relating to the suction process may be adapted to be sufficient so that only gravity-induced drainage to the discharge line 20 takes place. This makes almost noise-free operation of the urinal unit 41 possible.

By using the vacuum valve 21 with a coupling of the urinal discharge line 8 at the main discharge line 20, technical measures are necessary which initiate an automatic suction removal process when a defined fill level, e.g. fill level 39 in the main discharge line 20, has been reached. This is necessary to prevent any rise of the urine/water mixture into the toilet bowl 35. Furthermore, the fill level 39 in the main discharge line should not be visible to users of the toilet. This is achieved by the pipe architecture shown in FIG. 1. The fill level may, for example, be measured by the fill level sensor 24 in the main discharge line. Said fill level sensor 24 should be arranged either directly in the discharge line or on a fill-level sensor pickup 23 in the main discharge line, depending on the sensor technology used. In terms of the system 1, sensor technology is recommended that, in order to prevent measuring problems as a result of soiling, is not permanently in contact with the toilet wastewater mixture. A particular exemplary embodiment relates to an ultrasound sensor that detects the fill level height and is arranged to be sufficiently high above the maximum fill level so as not to become badly soiled.

The alternative pipe connection 45 of the urinal may, additionally or exclusively, represent connection of the urinal to the main discharge line 20 in order to protect the pipe or the fill-level sensor pickup 23 from soiling during the suction process. Redundancy of fill level measuring may be provided by a fill level sensor 29 in the toilet bowl in order to prevent the toilet unit 42 from overflowing, in particular in the case of a spatially separate arrangement of the toilet unit 42 from the urinal unit 41. The maximum fill level of the urinal bowl may be detected by way of a fill level sensor 13 in the urinal bowl. After the maximum fill level has been reached, for example as a result of a blockage in the urinal bowl discharge or in the urinal bowl overflow 12, an automatic suction removal process may be initiated which under the given circumstances may unblock the blockage.

The control unit 25 may be used centrally in relation to the toilet unit 42 and the urinal unit 41, or separate control units may be provided that communicate with each other. Connection 44 of the control unit to the aircraft, in terms of the power supply, CAN-Bus connection, and connection of discrete electricity lines may take place at the connection point 44. It makes sense to maintain a minimum gradient 14 of the discharge line 8 of the urinal and of the overflow line 7 of the urinal in order to make it possible to provide gravity-induced drainage from the urinal bowl 2 to the main discharge line 20. Adjusting the distance of the toilet unit 42 from the urinal unit 41 should be carried out in pipe section 6. In this arrangement an advantageous minimum gradient 14 of approx. 2-3% should be observed. The overflow line 7 of the urinal, the discharge line 8 of the urinal, and the main discharge line 20 may comprise a non-stick interior lining of the pipe in order to reduce deposits and prevent odor formation. Furthermore, an antibacterial interior lining may be provided in these pipes in order to prevent the formation and propagation of bacteria which may also cause unpleasant odors. The coatings may also be applied to the urinal bowl 2 or the toilet bowl 35 in order to achieve the same effect. With very effective interior linings of the pipes and a correspondingly optimized pipe architecture it may, ideally, be possible to do away with any odor traps. However, the provision of odor traps 17 or 10 and 11 is recommended to achieve delimitation of odors of the main discharge line. The overflow line 7 of the urinal may also be connected directly to the main discharge line 20, either upstream or downstream of the coupling 19, in order to provide redundancy in the case of blockage of the discharge line 8.

Figure 2:
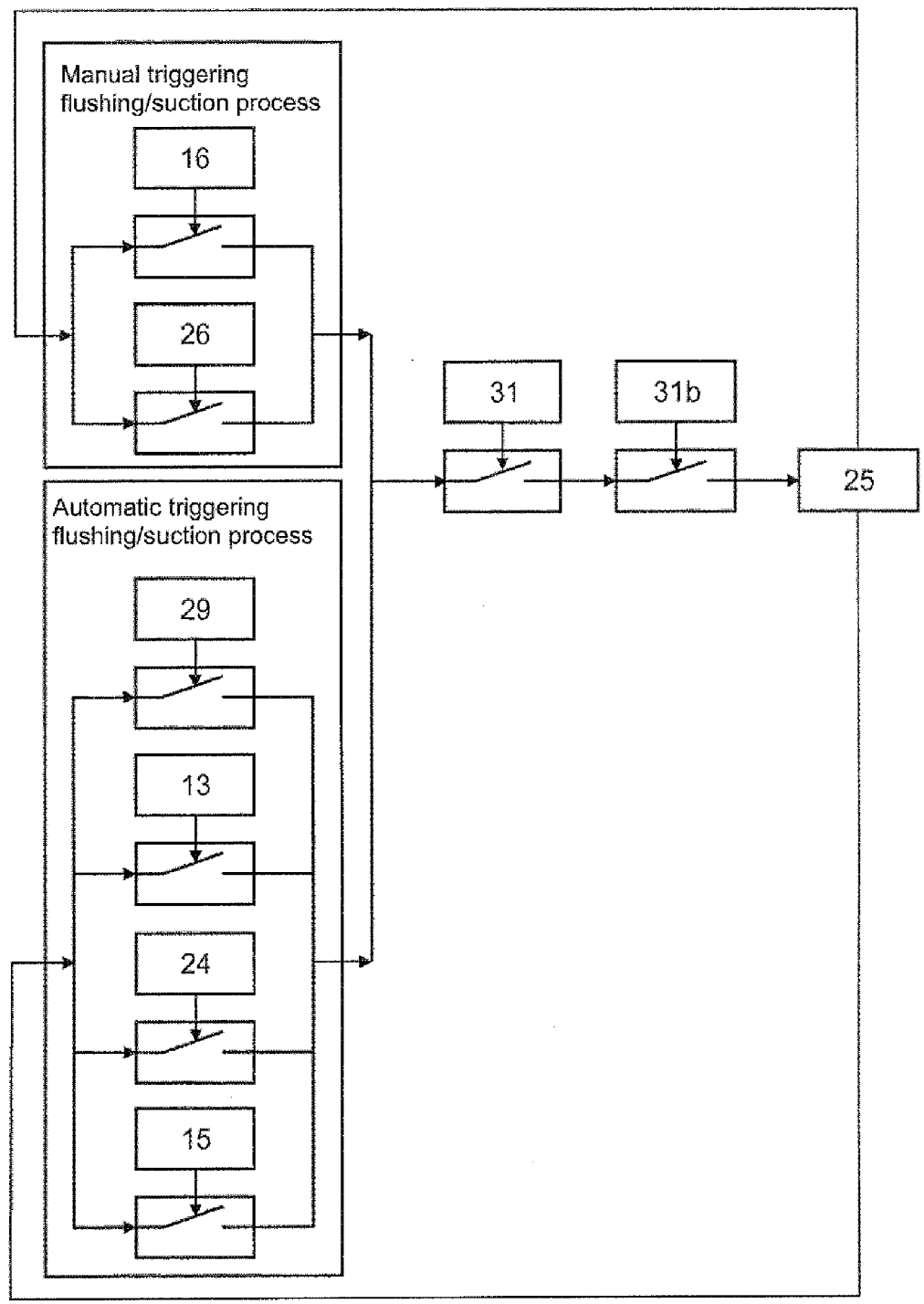
FIG. 2 shows a logic circuit diagram according to an exemplary embodiment of the invention.

FIG. 2 shows a logic circuit diagram according to an exemplary embodiment of the invention. Manual triggering may, as an alternative, for example, take place by the triggering elements 16 or 26. As an alternative, automatic triggering may take place by the fill level sensor of the toilet bowl 29, the fill level sensor of the urinal bowl 13, the fill level sensor of the discharge line of the toilet 24, and/or the person detection device or space monitoring detector of the urinal 15. However, release takes place only if the person/space monitoring sensor of the toilet 31 or both sensors 31, 31b indicate that no person is present in the space.

FIG. 3 shows a diagrammatic arrangement comprising several urinals and several sit-down toilets according to an exemplary embodiment of the invention. In this arrangement several urinals or several toilets may be provided. Querying the occupation thereof then takes place in such a manner that, for example, several toilets are monitored in terms of their occupation or their use as intended. In this arrangement it is sensible if querying the several toilets is linked in such a manner that triggering is prevented if even a single toilet is occupied. However, if the flow cross sections are dimensioned in such a manner that a predetermined number of unoccupied toilets already precludes suction removal from the remaining toilets, then for triggering the vacuum valve 21 it is sufficient to ensure that the predetermined number are not occupied. This may, of course, analogously also be provided in relation to the urinals.

Figure 4:
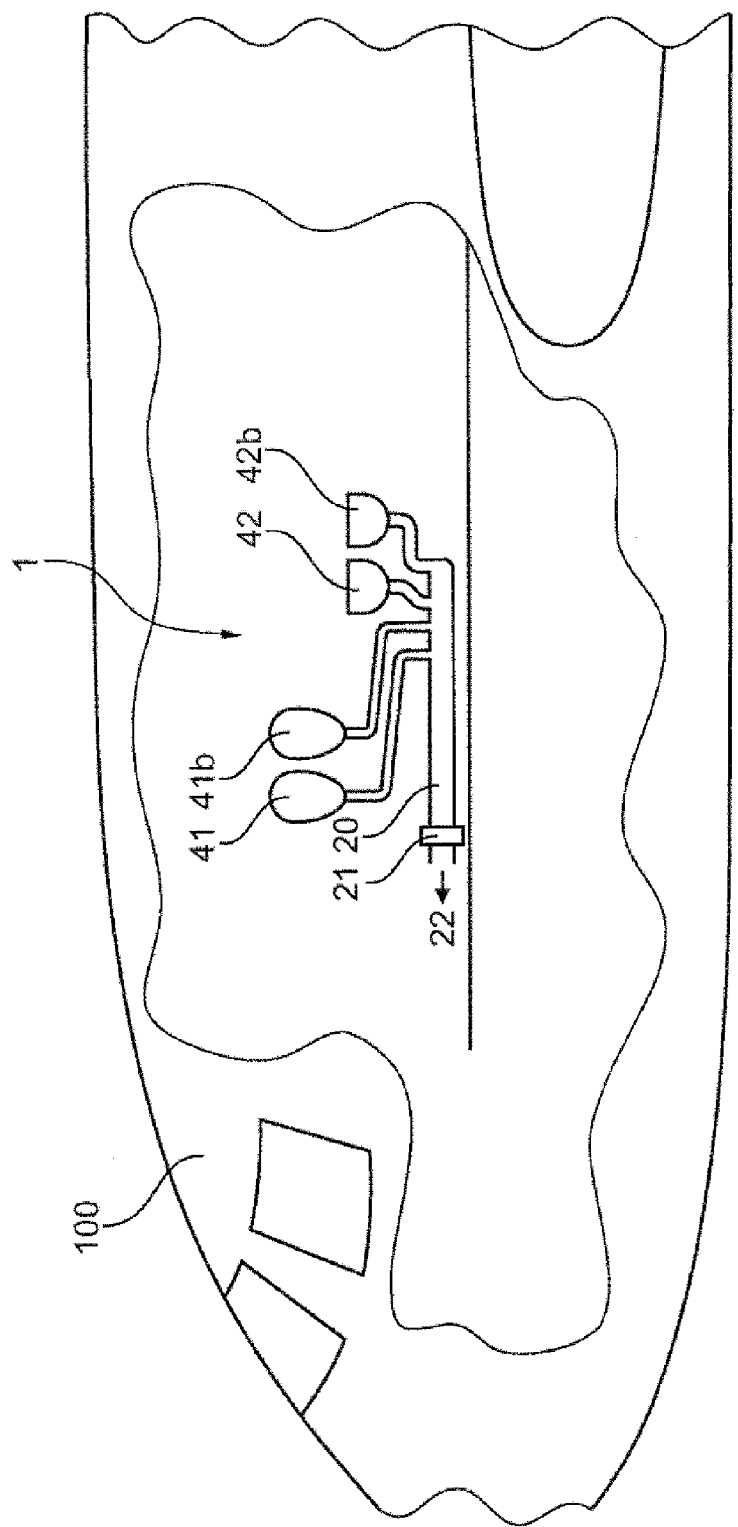
FIG. 4 shows an aircraft comprising a vacuum toilet unit having a urinal function according to an exemplary embodiment of the invention.

FIG. 4 shows an aircraft comprising a vacuum toilet unit having a urinal function according to an exemplary embodiment of the invention. The illustration shows a typical installation situation of such a unit in an aircraft 100.

It should be pointed out that apart from the field of aviation the present invention may also be applied in the field relating to aerospace, or in ships or boats, trains, buses or mobile homes.

It should be noted that the term "comprising" does not exclude other elements or steps, and the term "a" or "one" does not exclude a plural number.

The reference characters used serve only to provide a better understanding; they should in no way be interpreted as limiting, wherein the scope of protection of the invention is defined by the claims.

LIST OF REFERENCE CHARACTERS

1 System
2 Urinal bowl
3 Flushing nozzle or flushing ring, urinal
4 Flushing-water supply, urinal
5 Flushing-water valve, urinal
6 Coupling discharge line, urinal
7 Overflow line, urinal
8, 8b Discharge line, urinal
9 Coupling overflow line, urinal
10 Odor trap, urinal bowl discharge
11 Odor trap, urinal bowl overflow
12 Overflow, urinal bowl
13 Fill level sensor, urinal bowl
14 Gradient, discharge line, urinal
15 Person/space monitoring sensor, urinal
16 Triggering device, urinal
17 Odor trap discharge line, urinal
18 Coupling discharge line, urinal to odor trap
19 Coupling discharge line, urinal discharge line toilet
20 Main discharge line
21 Vacuum valve
22 Wastewater disposal, urinal and toilet (vacuum system)
23 Fill-level sensor pickup discharge line, toilet
24 Fill level sensor discharge line, toilet
25 Control unit, toilet and urinal
26 Triggering device, toilet
27 Flushing-water supply, toilet
28 Flushing-water valve, toilet
29 Fill level sensor, toilet bowl
30 Flushing nozzle or flushing ring, toilet
31, 31b Person/space monitoring sensor, toilet
32 Toilet lid
33 Toilet seat
34 Cladding, toilet unit
35 Toilet
36 Incoming air for flushing the toilet with the toilet lid closed
37 Toilet lid sensor
38 Incoming air for flushing the toilet with the toilet lid open
39 Fill level, discharge line, toilet
40, 40b Pipe bend, discharge line, toilet
41, 41b Urinal unit
42, 42b Toilet unit
43 Secondary airflow, urinal unit
44 Control connection to aircraft 45 Alternative pipe connection, urinal
46 Sieve, urinal discharge
47 Sieve, urinal overflow
100 Aircraft

The invention claimed is:

1. A vacuum toilet unit having a urinal function, comprising:
   a sit-down toilet,
   a urinal,
   a main discharge,
   a shared vacuum valve, and
   a lockable triggering device for triggering the shared vacuum valve,
   wherein the sit-down toilet has a toilet wastewater discharge,
   wherein the urinal has a urinal water discharge,
   wherein the toilet wastewater discharge and the urinal water discharge are connected to the main discharge,
   wherein the main discharge is connected, via the shared vacuum valve, to a vacuum wastewater system such that the shared vacuum valve controls flows, into the vacuum wastewater system, from the toilet wastewater discharge and the urinal water discharge through the main discharge,
   wherein the triggering device for triggering the shared vacuum valve is adapted in such a manner that the triggering unit may not be triggered when a person is seated on the sit-down toilet.

2. The vacuum toilet unit having a urinal function of claim 1, further comprising an activation element for triggering the lockable triggering device, wherein the activation element is arranged in such a manner that locking takes place as a result of a person not being able to reach the activation element when a person is seated on the sit-down toilet.

3. The vacuum toilet unit having a urinal function of claim 1, wherein the sit-down toilet comprises a person monitoring device adapted to lock the lockable triggering device when the presence of a person seated on the sit-down toilet is detected.

4. The vacuum toilet unit having a urinal function of claim 1, wherein the sit-down toilet comprises a toilet lid sensor and is adapted to lock the lockable triggering device on the basis of an acquired position of a toilet lid by the toilet lid sensor.

5. The vacuum toilet unit having a urinal function of claim 1, wherein the sit-down toilet and the urinal are located in separate spaces in such a manner that simultaneous use as intended is possible.

6. The vacuum toilet unit having a urinal function of claim 1, wherein the sit-down toilet is adapted as a sound-absorbing bypass to the urinal during vacuum suction.

7. The vacuum toilet unit having a urinal function of claim 1, wherein the urinal is adapted as a sound-absorbing bypass to the sit-down toilet during vacuum suction.

8. The vacuum toilet unit having a urinal function of claim 1, further comprising a plurality of urinals, each comprising a urinal water discharge,
   wherein the urinal water discharges in the direction of flow lead into the main discharge so as to be upstream of the vacuum valve,
   wherein the plural number of urinals together have an effective flow resistance that is matched to the flow resistance of the sit-down toilet, and
   wherein the plurality of urinals is adapted as a sound-absorbing bypass to the sit-down toilet during vacuum suction.

9. The vacuum toilet unit having a urinal function of claim 1, further comprising a second sit-down toilet with a second toilet water discharge,
   wherein the second toilet water discharge in the direction of flow leads into the main discharge so as to be upstream of the shared vacuum valve, and
   wherein the lockable triggering device is adapted in such a manner that the triggering unit may not be triggered when a person is seated on at least one of the sit-down toilet and the second sit-down toilet.

10. The vacuum toilet unit having a urinal function of claim 7, further comprising an activation element for manually operating the lockable triggering device, wherein the triggering unit may not be triggered when a person is seated on at least one of the sit-down toilet and the second sit-down toilet.

* * * * *